Patented Sept. 23, 1947

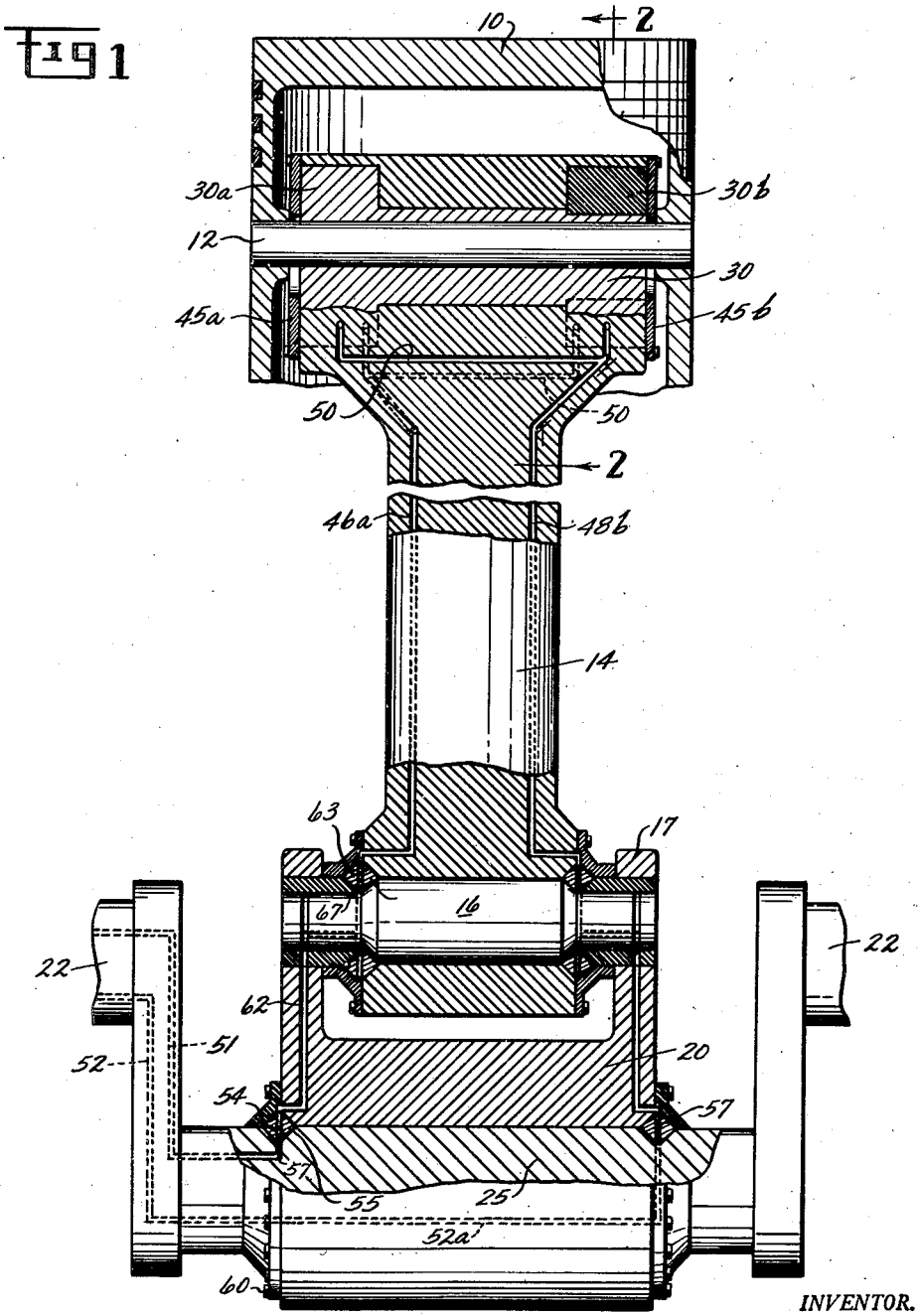

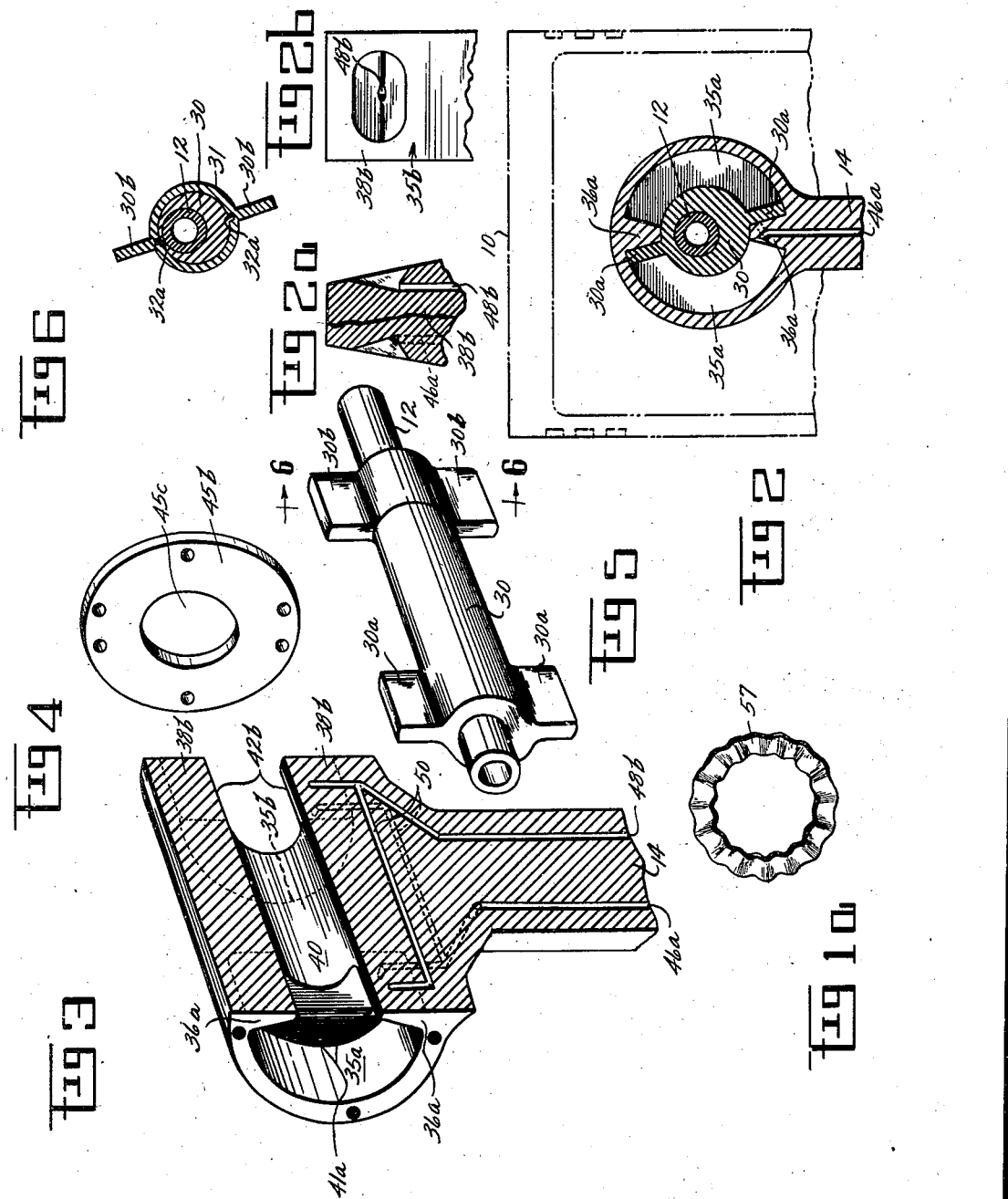

2,427,668

UNITED STATES PATENT OFFICE 2,427,668

VARIABLE COMPRESSION ENGINE

Peter L. Gill, Detroit, Mich.

Application September 1, 1945, Serial No. 614,018

5 Claims. (Cl. 123—48)

(Granted under the act of March 3, 1883, as amended April 30, 1928; 370 O. G. 757)

The invention described herein may be manufactured and used by or for the Government for governmental purposes without payment to me of any royalty thereon.

This invention relates to internal combustion engines and more particularly to internal combustion engines of the variable compression type.

In the operation of aircraft it is desirable to provide high engine power at take-off even though such power is achieved at the sacrifice of thermal efficiency. On the other hand, high terminal efficiency is desirable while cruising in order to maintain economic operation.

Accordingly, in its broader aspects my invention provides a combination of piston and connecting rod including means for positioning the piston with respect to the rod in either of two positions. In one position there is an increase in the charge drawn into the cylinder to obtain high power, while in the second position the charge is not as large as in the first case but is compressed to an extent whereat high thermal efficiency is obtained.

It is therefore an object of my invention to provide a simple structure for obtaining one or the other of two predetermined compression ratios in an internal combustion engine.

It is a further object of my invention to provide a hydraulic motor means for actuating a piston with respect to a connecting rod so as to place it in position for a higher or lower compression ratio.

Disclosure of my invention will now be made in conjunction with the accompanying drawings, in which:

Fig. 1 is a cross section through a piston, main or master connecting rod and connecting rod of a radial type engine, certain elements of my invention being shown thereon;

Fig. 1a is a perspective of one of the members shown in Fig. 1;

Fig. 2 is a section through 2—2 of Fig. 1;

Fig. 2a shows in section an enlarged portion of a lower hydraulic motor barrier taken at two different planes indicated on opposite sides of the central irregular line;

Fig. 2b is a right wall elevational view of the hydraulic motor barrier shown in Fig. 2a;

Fig. 3 is a perspective of the upper end of the connecting rod, being shown partially in section to reveal the motor chambers and fluid passages;

Fig. 4 is a perspective of one of the members comprising the hydraulic motor;

Fig. 5 is a perspective of the rotary element of the hydraulic motor; and

Fig. 6 is a section through 6—6 of Fig. 5.

With reference to Figures 1 and 2 of the drawings, a piston 10 is shown having a wrist pin 12 passing therethrough for securing the piston to a connecting rod 14 which is in turn hingedly secured by the knuckle pin 16 to the cheeks 17 of the main or master connecting rod 20 of a radial type engine having a crank shaft 22 secured to the main or master connecting rod 20 on a bearing 25, in which it is conventional for one main or master connecting rod to connect directly between the crankshaft and one piston and the remaining articulated connecting rods to be hingedly connected to the main or master connecting rod about its crankshaft bearing portion. Rotatively disposed on wrist pin 12 is an eccentric bushing 30 (Fig. 5) having formed integrally therewith vanes 30a at one extremity thereof. A pair of vanes 30b (Fig. 6) integrally formed with a collar 31 are supported on bushing 30 and keyed thereto by keys 32a and 32b in such a manner that the vanes 30a and 30b are kept in alignment and can rotate in unison on wrist pin 12. Connecting rod 14 is formed with two pairs of semicircular chambers (Figs. 2 and 3) 35a and 35b, the chambers 35a being hydraulically separated by barriers 36a and the chambers 35b being separated by barriers 36b. Intermediate the chambers is a cylindrical bearing surface 40 integrally formed of the connecting rod material, and the barriers have radially facing surfaces 41a and 42b of circular contour which join flushly with the bearing surface 40 so that bushing 30 may be supported for rotation on the bearing surface 40 and on surfaces 41a and 42b with the vanes 30a and 30b rotationally operative in the chambers 35a and 35b, respectively. End plates 45a and 45b (Figs. 1 and 4) are secured to the connecting rod in any suitable manner, such as by bolts, in order to close the chambers and retain bushing 30 in fixed position with respect to lateral motion in the interior of the piston, the end plates being of sufficient thickness to take up any play between the ends of the bushing and the bosses in which the wrist pin sets and having sufficiently large central apertures 45c to permit vertical reciprocation of the wrist pin as viewed on Fig. 1 with respect to the connecting rod between the two limits of compression. The structure thus far described is symmetrical insofar as the arrangement of vanes and semicircular chambers is concerned, the arrangement being such that each vane works as a piston in its respective chamber and a pair of vanes is provided on each side of the bearing surface 40 so as to render mechanically balanced actuation to effect a reversible hydraulic motor when fluid pressure is brought into the several chambers in a manner hereinafter described.

It will be understood from consideration of Fig. 2 that rotation of bushing 30 will cause the piston 10 to move longitudinally with respect to connecting rod 14 to an extent determined by the eccentricity of the bushing 30, one of the limiting positions being shown on Figs. 1 and 2 for a condition of high compression, i. e., the piston is in maximum upward position with respect to the connecting rod. Obviously, were bushing 30 to be rotated by fluid pressure counterclockwise, as viewed on Figure 2, wrist pin 12 and piston 10 would be reciprocated downwardly with respect to the connecting rod which would correspond to a condtiion of low compression, the limiting position of piston 10 being reached when the vanes 30a come into abutment with their respective barriers.

Fluid pressure is fed into the chambers 35a and 35b through passages in the barriers 36a and 38b from passages 46a and 48b, there being cross passages 50 in the lower portion of the barriers, the arrangement being such that the walls of each lower barrier 36a and 36b have ports as shown in an enlarged illustration of the lower hydraulic motor barrier 38b with the relative positions of the passages 46a and 48b shown therein in Figs. 2a and 2b, facing into respective chambers so that fluid from passage 48b may be directed into the right-hand chambers of chamber pairs 35a and 35b while fluid from passage 46a may be directed into the lefthand chambers of pairs 35a and 35b, as viewed on Figures 2 and 3. Accordingly clockwise or counterclockwise rotation of bushing 30 may be obtained, that is when fluid under pressure is supplied through passage 46a, clockwise rotation is effected producing the condition of Fig. 2, but when fluid under pressure through passage 43b is provided, counterclockwise rotation is effected. In either case rotation of bushing 30 continues until a limiting position is reached, or in other words until the vanes are in abutment against the barriers, so that, e. g., when fluid pressure is provided in passage 48b counterclockwise rotation of bushing 30 will produce a definite compression ratio which, though lower than that shown for the condition of Fig. 2, results in a greater charge being drawn into the cylinder. It will be understood that when passage 46a is feeding fluid pressure, passage 48b has the pressure relieved therein and vice versa, so that the hydraulic fluid in the passive side of the motor may be exhausted. The passages 46a and 48b are fed with fluid through the crankshaft 22 (Fig. 1) which is provided with passages as indicated by the dotted lines 51 and 52, the fluid under pressure being conducted into a space afforded by a pair of triangularly sectioned sealing rings 54 and 55 resiliently held apart by a spring 57 (Fig. 1a). The arrangement is such that the apex of the triangular section of the ring 54 is forced into contact at the jointure of a flange 60 and the crank pin 25 so as to provide a sealing effect and in a similar manner the ring 55 seals against loss of liquid at the jointure between connecting rod 20 and crank pin 25. It will be understood that the spring 57 may be of any suitable design such as helical or spider type provided that it does not obstruct passage of fluid from passing between the sealing rings and up into a connecting rod channel 62. A method of conducting the fluid from passage 62 into the connecting rod 14 is similar to that just described in that the use of sealing rings 63 and 64 with a spring 67 therebetween is relied on. Feeding of fluid from passage 52 into passage 48b is accomplished in identically the same manner as just described for passage 46a and no further description is deemed necessary save to say that knuckle pin 25 is provided with a transverse passage 52a to bring the fluid to the opposite side of the knuckle pin for transmission to passage 48b.

It will be appreciated that although my structure is intended to be utilized for one or the other of two predetermined compression ratios for the specific purposes described above, nevertheless by locking the fluid in the motor chambers 35a and 35b, any intermediate compression ratio is obtainable. The fluid may be thus locked in any suitable manner, as will be understood by persons skilled in the art. The use of intermediate compression ratios is a feature within purview of my invention and I seek protection therefor in the following claims.

I claim:

1. In a variable compression engine, the combination of a piston, a wrist pin and a connecting rod, and a cylindrical eccentric member rotationally supported on said wrist pin and having bearing coaction with said connecting rod, and means for rotating said eccentric member to displace said piston with respect to said connecting rod, said means comprising vane means provided on said eccentric member and chamber means disposed on said connecting rod and rotationally accommodating said vane means, and means for providing fluid pressure to said chamber means for actuating said vane means to rotate said eccentric member.

2. In the combination as set forth in claim 1, wherein said chamber means comprises a pair of semicircular chambers integrally formed on said connecting rod, said chambers being hydraulically separated by means comprising barriers, a cylindrical bearing surface formed in an end of said connecting rod of the material thereof, said barriers extending into integral jointure with said bearing material and having surfaces arranged flushly with said bearing surface and being provided with the same radius of curvature and being adapted to slidingly and sealingly engage said eccentric member, and passage means longitudinally disposed within the material of said connecting rod and terminating in ports on respective chamber sides of said barriers.

3. In the combination as set forth in claim 1, wherein said chamber means comprises a pair of chambers, means comprising barriers hydraulically separating said chambers and extending into sliding and sealing engagement with said cylindrical eccentric member.

4. In the combination set forth in claim 1, wherein said eccentric member comprises an elongated bushing, said vane means comprising pairs of diametrically opposed vanes disposed at the extremities of said bushing, and pairs of semicircular chambers formed on opposite sides of said rod and adapted to house said vanes, said vanes having rotational movement in said chambers, said bearing coaction comprising a bearing surface in said connecting rod intermediate said pairs of chambers and encompassing said bushing intermediate said vanes.

5. In the combination set forth in claim 1, said chamber means comprising semicircular chambers formed in an end of said connecting rod, said chambers being hydraulically separated by means comprising barriers, and end plate means closing said chambers and sealingly coacting with said barriers and said eccentric member and having centrally disposed perforate means, said wrist pin protruding through said perforate means, said perforate means being adapted to provide clearance for reciprocation of said wrist pin radially of said chambers.

PETER L. GILL.

REFERENCES CITED

The following references are of record in the file of this patent:

UNITED STATES PATENTS

| Number | Name | Date |
|---|---|---|
| 1,174,459 | Winckler | Mar. 7, 1916 |
| 2,029,169 | Hironaka | Jan. 28, 1936 |
| 2,153,691 | Hironaka | Apr. 11, 1939 |
| 2,283,022 | Wallgren | May 12, 1942 |
| 2,294,105 | Wallgren | Aug. 25, 1942 |
| 2,134,995 | Anderson | Nov. 1, 1938 |

FOREIGN PATENTS

| Number | Country | Date |
|---|---|---|
| 412,781 | Great Britain | July 5, 1934 |